United States Patent
Jeong

[19]

[11] Patent Number: 5,873,728
[45] Date of Patent: Feb. 23, 1999

[54] SOUND PRONUNCIATION COMPARING METHOD IN SOUND SIGNAL REPRODUCING APPARATUS

[75] Inventor: Byung Mann Jeong, Suwon, Rep. of Korea

[73] Assignee: Samsung Electronics Co., Ltd., Kyungki-do, Rep. of Korea

[21] Appl. No.: 618,775

[22] Filed: Mar. 20, 1996

[30] Foreign Application Priority Data

May 23, 1995 [KR] Rep. of Korea ................. 1995-12851

[51] Int. Cl.$^6$ ..................................................... G09B 5/00
[52] U.S. Cl. ............................. 434/185; 434/157; 704/1; 704/200
[58] Field of Search ................................ 434/157, 185, 434/156, 167, 169, 176, 317, 319, 320; 704/1–10, 200, 201

[56] References Cited

U.S. PATENT DOCUMENTS

| | | |
|---|---|---|
| 4,615,680 | 10/1986 | Tomatis .................................... 434/185 |
| 4,895,519 | 1/1990 | Beller et al. .............................. 434/185 |
| 5,191,488 | 3/1993 | Hashimoto . |
| 5,266,034 | 11/1993 | Mitz ......................................... 434/185 |
| 5,362,240 | 11/1994 | Cave et al. ............................... 434/157 |

*Primary Examiner*—Glenn E. Richman
*Attorney, Agent, or Firm*—Sughrue, Mion, Zinn, Macpeak & Seas, PLLC

[57] ABSTRACT

A pronunciation comparison method permits a user to directly and repeatedly compare the user's own sound with sound which is reproduced from a recording medium. The sound signal which is reproduced from a recording medium, as well as the user's own sound signal, in attempt to emulate the reproduced sound, are both recorded in a sound storage medium. Then the reproduced sound and user sound are output sequentially from the storage medium via a speaker so that the user may directly compare the two sounds. The sequential outputting of the reproduced sound and user sound may be repeated any number of times, the number of repetitions being selected by the user.

12 Claims, 3 Drawing Sheets

SOUND PRONUNCIATION COMPARING METHOD IN SOUND SIGNAL REPRODUCING APPARATUS

BACKGROUND OF THE INVENTION

1. Field of the Invention

The present invention relates to a sound signal reproduction. More specifically, it relates to a pronunciation comparison by storing sound signals reproduced from a recording medium (called 'reproduced sound') and sounds made by a user (called 'user sound') into a storage medium, and outputting contemporaneously the reproduced sound and the user sound, thus making it possible for the user to directly compare the reproduced sound and the user sound.

2. Description of the Background Art

When a conversation practice function is included in sound reproducing apparatus for language practice, it generally divides sentences one by one. That is to say, the reproduced sentences are separated by a time space. To accomplish this conversation practice function, a conventional apparatus has a recording medium and a motor which moves the recording medium at a predetermined speed to reproduce the sound from the recording medium for a certain time. The reproduced sound is stored into the recording medium and the reproduced sound is outputted repeatedly according to the user's choice. Then the motor is stopped temporarily so that the user can say the reproduced sound.

The conventional sound signal reproducing apparatus for language practice is intended to output reproduced sound for a certain time and stop the motor temporarily. This enables the user to analyze the pronunciation of the reproduced sound but does not make provision for him to check his own user sound. Accordingly, the conventional apparatus has the problem that effective language practice was impossible.

SUMMARY OF THE INVENTION

The present invention is made to solve the problem mentioned above, and to provide a highly effective sound signal reproducing apparatus. The method and apparatus according to the present invention store the reproduced sound and the user sound and then sequentially output the stored sound signals (both "reproduced" and "user"). This enables the user to compare the reproduced sound and the user sound and thereby directly check pronunciation.

According to one aspect of the present invention, the pronunciation comparing apparatus includes a recording medium for recording sound signals, a head for reproducing sound signals from the recording medium, a microphone for receiving user sound signals, a storage medium for storing the sound signals, a speaker for outputting sound signals from the storage medium, a motor for controlling the movement of the recording medium, and a microcomputer for controlling each of the other structures in the apparatus.

According to another aspect of the present invention, the method includes: (1) a first step of storing in a storage medium a reproduced sound which has been reproduced from a recording medium; (2) a second step of temporarily stopping driving of the motor; (3) a third step of storing a user sound into said storage medium; and (4) a fourth step of sequentially outputting the reproduced sound and the user sound from the storage medium. In the method described above, it is desirable to set a repetition number for the reproduced sound and the user sound, and outputting the reproduced sound and the user sound together repeatedly according to the number of repetitions. If the number of repetitions is not set, it is desirable to output the reproduced sound and the user sound together only once.

According to the present invention for sound signal reproducing apparatus, there is an advantage of accomplishing highly effective language practice using the method of comparing the user sound with the reproduced sound by outputting sequentially the reproduced sound and the user sound from the recording medium.

DETAILED DESCRIPTION OF THE INVENTION

The desirable configuration and operation of the sound signal reproducing apparatus by the present invention is explained in detail below, with reference to drawing FIG. 1.

Figure 1:
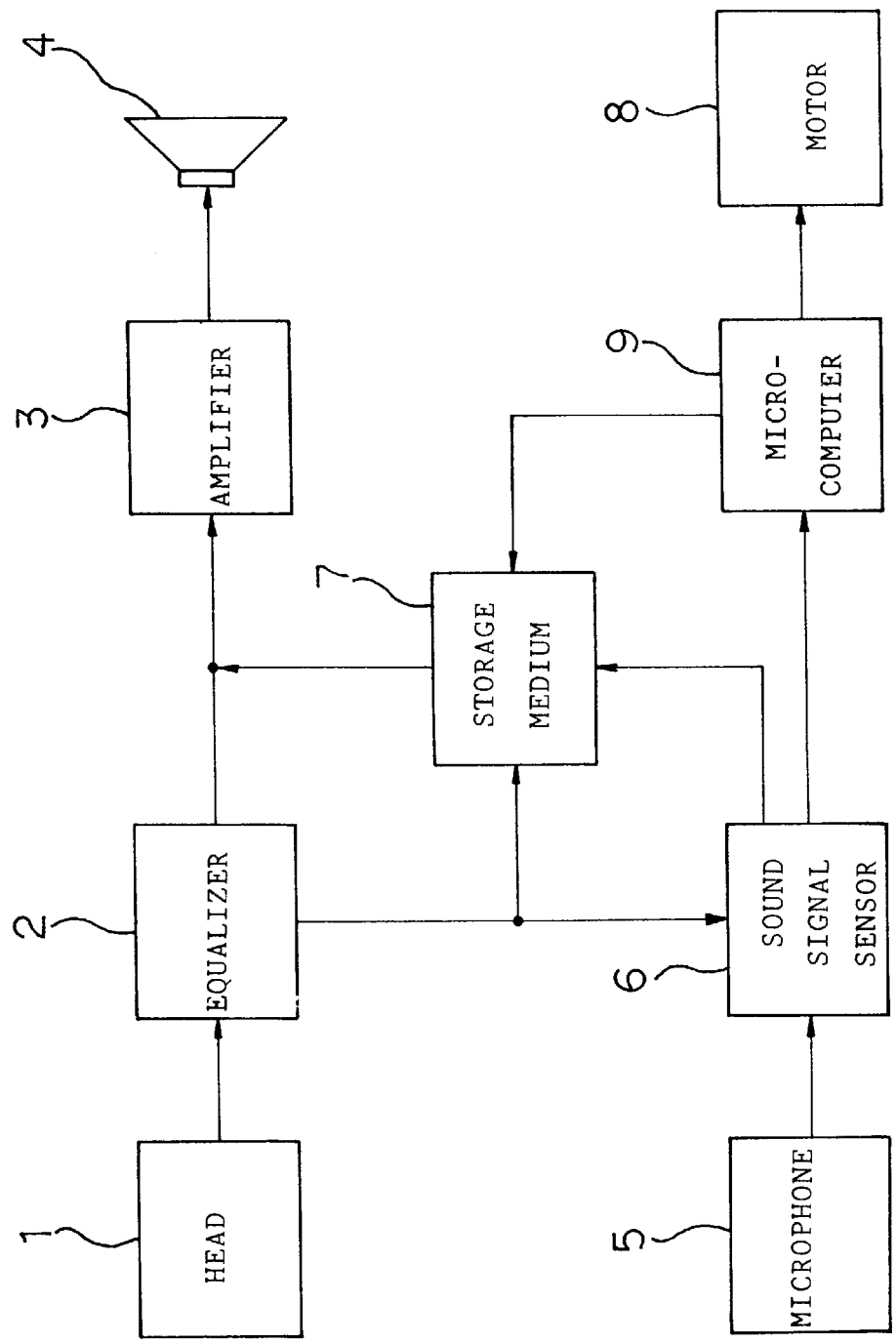
FIG. 1 shows a schematic diagram of a sound signal reproducing apparatus according to the present invention.

FIG. 1 is a schematic diagram of a sound signal reproducing apparatus according to the present invention. FIG. 1 shows head 1 to detect sound signals recorded on the recording medium (not shown) and an equalizer 2 to equalize the reproduced sound detected by head 1. An amplifier 3 amplifies the reproduced sound after it is equalized and speaker 4 outputs the amplified reproduced sounds so that the user can recognize the amplified reproduced sounds. A microphone 5 is provided to detect a user sound from outside the apparatus. The signal output by the microphone 5 is fed to a sound signal sensor 6 to detect levels of user sounds from the microphone 5. A storage medium 7 is provided to store the reproduction sound from the equalizer 2 and the user sound from the sound signal sensor 6 on storage. Motor 8 moves the recording medium (not shown) past the head 1 in accordance with command controls from a microcomputer 9. The microcomputer 9 also functions to control other components in the apparatus.

Figure 2A:
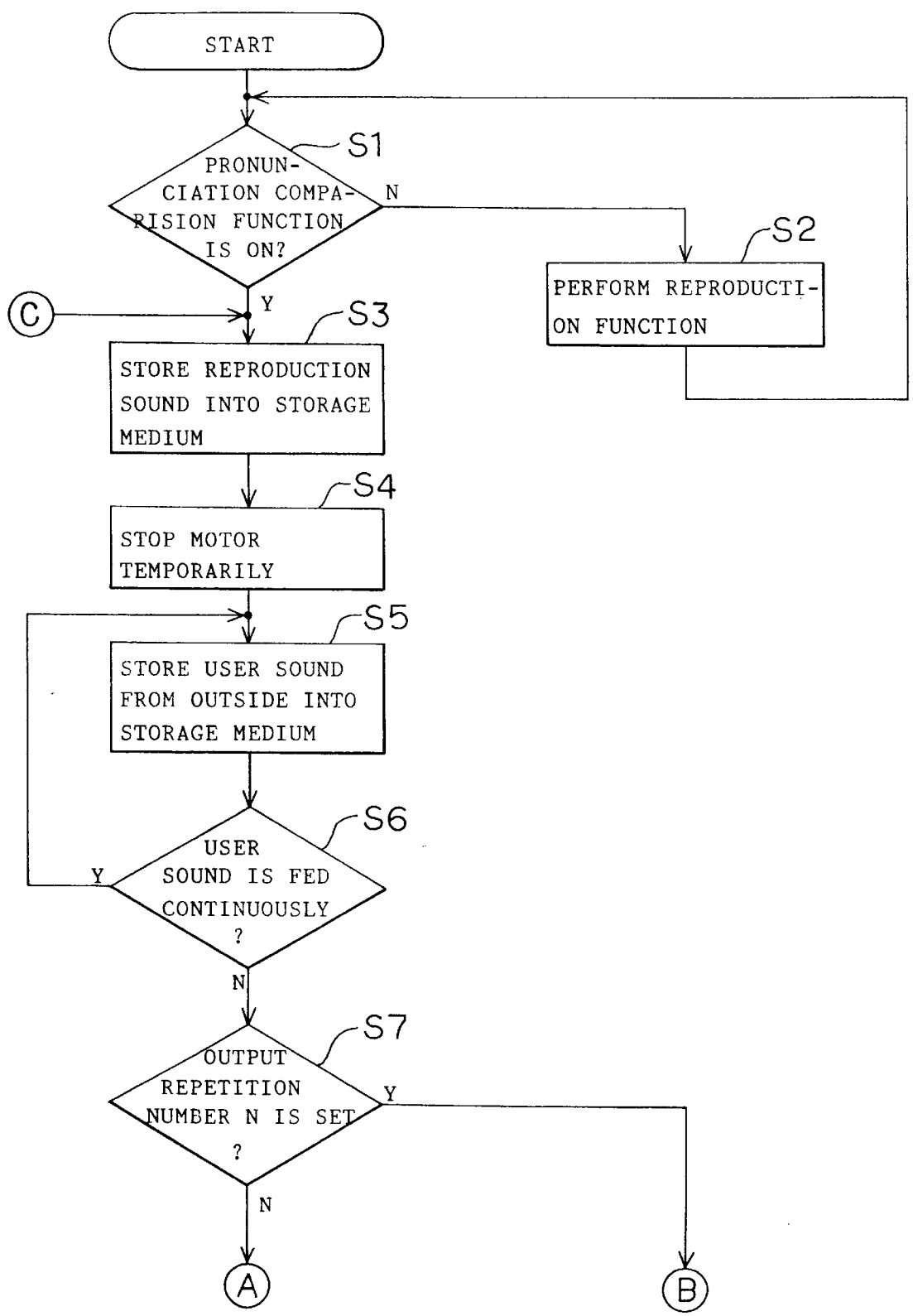
FIGS. 2A and 2B show a flow chart of a method to compare pronunciation of sound signals according to the present invention.
Figure 2B:
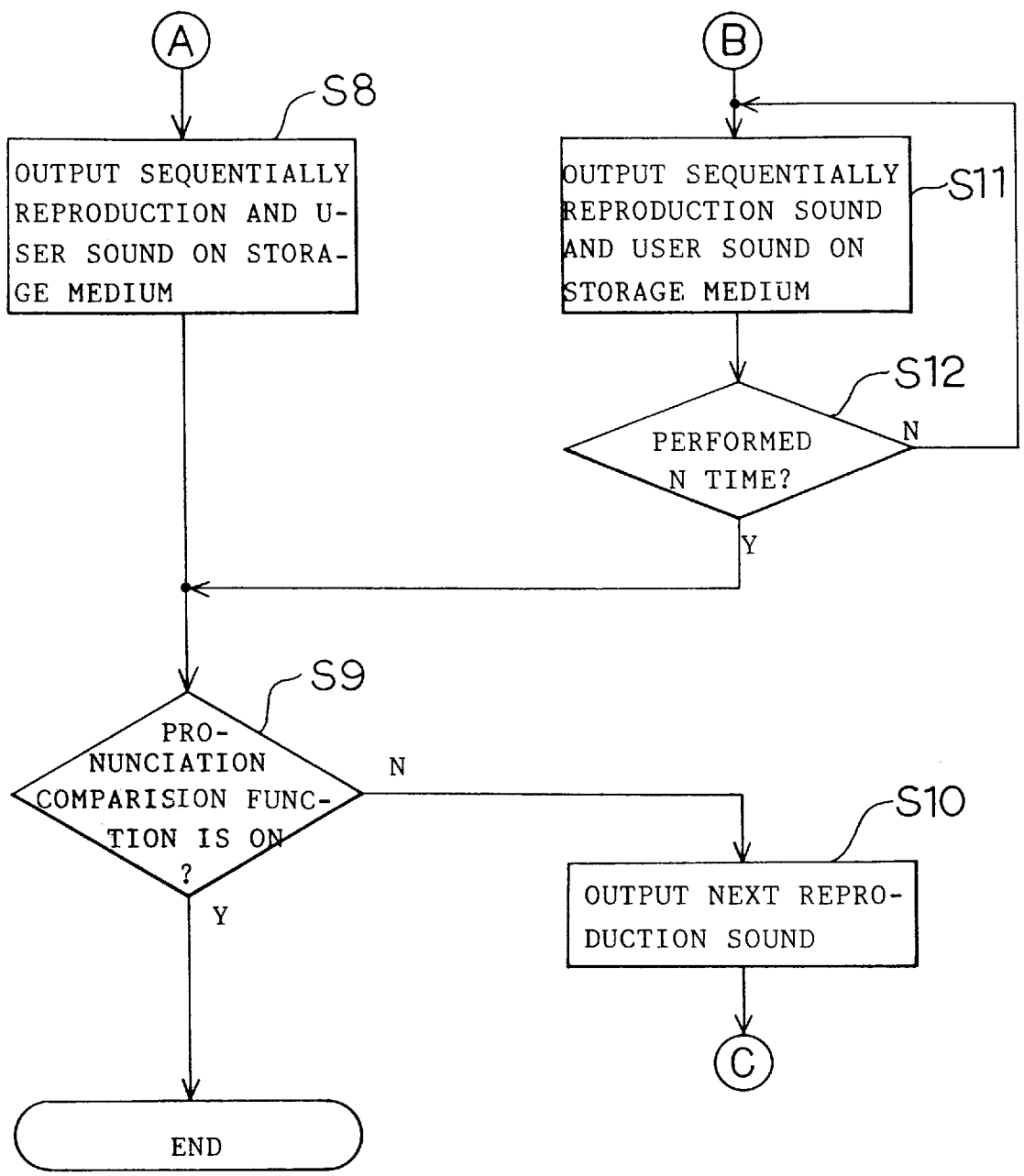

Operations of the present invention are explained in detail as follows with reference to the flow chart of FIGS. 2A and 2B. Microcomputer 9 initially checks whether or not the pronunciation comparison function is currently selected (step S1). If the pronunciation comparison function is not selected, the microcomputer simply permits the reproduction function to be performed (step S2). When the reproduction function (as opposed to the pronunciation function) is selected, the microcomputer 9 causes the motor 8 to operate so that a sound signal recorded on the recording medium is reproduced by head 1 and is fed to an equalizer 2. The equalizer 2 compensates the frequency level of sound signals reproduced by head 1 and outputs the compensated signal to an amplifier 3. The reproduced signal that is fed to amplifier 3 is amplified by a certain size and is output through the speaker 4. Accordingly, the user comes to hear the reproduced sound from the recording medium (step S2).

If, on the other hand, the microcomputer 9 determines that the pronunciation function is chosen (step S1), microcomputer 9 stores to the storage medium 7 a predetermined duration of reproduction sound reproduced from the recording medium (step S3). Thus, in the pronunciation mode, the reproduced sound from the recording medium is outputted through speaker 4 at the same time it is being stored into the storage medium 7. At the end of the predetermined duration of reproduction, the microcomputer 9 controls and temporarily stops driving the motor 8 (step S4). Accordingly, the motor operation for reproducing the sound signal is temporary stopped, switching into a state in which the user can speak repeatedly. When the user then repeatedly speaks so as to emulate the reproduced sound, this speech sound is detected by the microphone 5 and is inputted into the sound signal level sensor 6.

The sound signal level sensor 6 detects the sound signal level of the sounds detected by the microphone 5 and outputs a level signal to the microcomputer 9 corresponding to the sound signal level. If the level signal corresponding to the sound signal is above a predetermined set value, microcomputer 9 considers the sound signal inputted as the user sound. If, however, the level signal is below the predetermined set value, microcomputer 9 considers the sound signal inputted to be merely a noise and denies that the user sound has been inputted. When the level of user sound detected by the sound signal level detection section is above the set value, microcomputer 9 outputs a control signal to the storage medium 7 thereby causing the user signal from the sound signal level sensor 6 to be stored into the storage medium 7 (step S5).

Then the microcomputer 9 analyzes the sound signal level from the sound signal level sensor 6 and checks if the user sound is continuously inputted (step S6). At this step, if it is judged that the user sound is continuously inputted, the microcomputer 9 returns to step S5 and repeatedly performs the operation of storing user sound into the storage medium. When it is determined at step S6 that the user sound is not continuously inputted, the microcomputer 9 checks whether or not the repetition number for output was set (step S7).

The number of output repetitions, N, is a value that the user can set randomly. If the output repetition number N was not set, microcomputer 9 outputs a control signal to the storage medium 7 that causes a single sequential output of the reproduction sound and the user sound which are stored on the storage medium 7 (step S8). After step S8, the microcomputer 9 checks whether the pronunciation comparison function is suspended (step S9).

On the other hand, if it is determined at step S7 that the output repetition number N was set, the microcomputer 9 outputs a control signal to the storage medium that causes sequential output of the reproduction sound and the user sound which are stored in the storage medium 7 (step S11), and increases the number of an output counter (not shown) by one. After each sequential reproduction in step S11, the microcomputer 9 checks whether or not the output counter is equal to the set value N (step S12). At step S12, if the count number of output of the reproduction sound and the user sound is not the same as the set repetition number N, the microcomputer 9 returns to step S11 and performs steps S11 and S12 repeatedly. If at step S12, the output counter value is found to be the same as the set repetition number N, microcomputer 9 proceeds to step S9 and checks if the pronunciation comparison function is suspended.

At step S9, if the pronunciation comparison function is still selected, the microcomputer 9 controls motor 8 so as to move the recording medium normally, in order to output the next predetermined duration of reproduction sound (step S10). The operational flow then returns to step S3 in order to repeatedly perform the above described steps of operation. If the pronunciation function is found at step S9 to be suspended (i.e., not selected), the microcomputer 9 halts execution of the procedure.

As a result of the method and apparatus according to the present invention, the reproduction sound from the storage medium and the user sound are sequentially outputted, permitting the user to hear the reproduced sound and the user sound at the same time and compare the two sounds.

Although the invention has been described according to a preferred embodiment, it will be appreciated that various modifications and changes may be made without departing from the spirit and scope of the invention.

What is claimed is:

1. A pronunciation comparison method for use with an apparatus having a recording medium containing recorded sound, a storage medium for storing sound signals, and a motor for driving the recording medium, said pronunciation comparison method comprising the steps of:

(a) storing in the storage medium a reproduced sound which has been reproduced from the recording medium;

(b) temporarily stopping driving of the motor;

(c) storing a user sound into said storage medium; and (d) sequentially outputting the reproduced sound and the user sound from the storage medium.

2. The pronunciation comparison method according to claim 1, wherein said reproduced sound reproduced in step (a) is reproduced according to a predetermined time division to form a time-divided reproduced sound which is stored in the storage medium.

3. The pronunciation comparison method according to claim 1, wherein step (d) is repeatedly performed for a number of repetition equal to the value of a predetermined output repetition number N.

4. The pronunciation comparison method according to claim 3, wherein the reproduced sound and the user sound are sequentially output only once if said output repetition number has not been set.

5. The pronunciation comparison method according to claim 1, said method further comprising the step of:

(e) restarting driving operation of said motor and repeating steps (a) through (d) for a subsequent segment of said recording medium containing further recorded sound.

6. A sound reproduction apparatus for use in pronunciation comparison, said apparatus comprising:

a sound reproduction head;

a microphone;

a sound signal storage medium coupled so as to receive signals from said head and said microphone;

a motor for driving a recording medium past said head;

a speaker coupled so as to receive signals from said storage medium; and a microcomputer control means for controlling when said motor drives the recording medium, when signals from said head and said microphone are stored in said storage medium, and when signals from said storage are output to said speaker.

7. The sound reproduction apparatus according to claim 6, wherein a reproduced sound signal from said head is stored in said storage medium simultaneously with operation of said motor to drive the recording medium past the head.

8. The sound reproduction apparatus according to claim 7, wherein a user sound signal from said microphone is stored in said storage medium after driving operation of said motor is stopped.

9. The sound reproduction apparatus according to claim 8, wherein, after said reproduced sound signal and said user sound signal are stored in said storage medium, said reproduce sound signal and said user sound signal are output sequentially from said storage medium to said speaker.

10. The sound reproduction apparatus according to claim 6, wherein said apparatus further comprises:

a sound signal sensor, connected between said microphone, said storage medium and said microcomputer means, for determining when said user signal has been input through said microphone, coupling said user signal to said storage medium, and signalling said microcomputer means when said user signal has been determined.

11. The sound reproduction apparatus according to claim 6, wherein said apparatus further comprises:

an amplifier connected to said speaker to drive said speaker with signals coupled to said speaker from said storage medium and said head.

12. The sound reproduction apparatus according to claim 11, wherein said apparatus further comprises:

an equalizer connected between said head, said storage medium, and said amplifier, to equalize head signals from said head before coupling the head signals onward to said storage medium and said amplifier.

* * * * *